US012127564B2

(12) United States Patent
Chen et al.

(10) Patent No.: US 12,127,564 B2
(45) Date of Patent: Oct. 29, 2024

(54) PREPARATION METHOD OF FLOUR WITH LOW OIL ABSORPTION DURING FRYING

(71) Applicant: Jiangnan University, Wuxi (CN)

(72) Inventors: Long Chen, Wuxi (CN); Yuanhui Chen, Wuxi (CN); Zhengyu Jin, Wuxi (CN); Yaoqi Tian, Wuxi (CN); Ming Miao, Wuxi (CN); Jianwei Zhao, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 18/641,553

(22) Filed: Apr. 22, 2024

(65) Prior Publication Data

US 2024/0260589 A1    Aug. 8, 2024

(30) Foreign Application Priority Data

May 17, 2023    (CN) .......................... 202310555852.6

(51) Int. Cl.
*A21D 2/26*    (2006.01)
*A21D 2/30*    (2006.01)
*A21D 6/00*    (2006.01)
*A21D 8/04*    (2006.01)

(52) U.S. Cl.
CPC ............. *A21D 8/042* (2013.01); *A21D 2/261* (2013.01); *A21D 2/30* (2013.01); *A21D 6/003* (2013.01)

(58) Field of Classification Search
CPC .................................................... A21D 8/042
See application file for complete search history.

(56) References Cited

U.S. PATENT DOCUMENTS

2002/0009529 A1*    1/2002    Kamada ................... A21D 2/18
426/555

FOREIGN PATENT DOCUMENTS

| CN | 111513256 A | 8/2020 |
| CN | 112314715 A | 2/2021 |
| JP | H0678663 A | 3/1994 |

(Continued)

OTHER PUBLICATIONS

Xiangzhen Nie et. al. "Research advance on reducing grease residue of fried instant noodles by additives" Journal of Triticeae Crops, 36(5) 611-615, May 10, 2016.

(Continued)

*Primary Examiner* — Lien T Tran
(74) *Attorney, Agent, or Firm* — IPRO, PLLC; Na Xu (57) ABSTRACT

Disclosed are a preparation method and application of flour with low oil absorption during frying, belonging to the field of flour modification. The preparation method of flour with low oil absorption during frying increases the cross-linking degree of starch, protein, and starch-protein in the flour by adding glutamine transaminase first and then phytic acid or adding phytic acid first and then glutamine transaminase so as to improve the compactness of the flour structure, which reduces water evaporation and oil absorption during frying after the flour is made into dough, and thus ultimately forms the modified flour with low oil absorption during frying. The method is simple, green, pollution-free, and low in energy consumption, and the modified flour prepared has improved thermal stability and reduced oil absorption after frying. The present disclosure has broad application prospects in the fields of flour modification and fried foods.

8 Claims, 5 Drawing Sheets

(56) References Cited

FOREIGN PATENT DOCUMENTS

| JP | 2004033139 A | 2/2004 |
| KR | 20020015213 A | 2/2002 |
| WO | 0215713 A1 | 2/2002 |

OTHER PUBLICATIONS

Zhongkai Zhou et. al. "Application of transglutaminase in gluten and non-gluten products" Food and Oil,26(2) 9-12, 2013.

* cited by examiner

| Samples | $T_0$ (°C) | $T_p$ (°C) | $T_c$ (°C) | $\triangle H$ (J/g) |
|---|---|---|---|---|
| Example 1 | 62.31±0.06ab | 64.64±0.06a | 67.76±0.13a | 5.67±0.14a |
| Example 2 | 62.07±0.36ab | 64.48±0.38a | 67.63±0.38a | 5.45±0.06ab |
| Comparative example 1 | 60.22±0.04g | 62.71±0.01d | 65.9±0.22de | 4.65±0.16d |
| Comparative example 2 | 60.69±0.38fg | 63.09±0.37cd | 66.30±0.51de | 5.20±0.12bc |
| Comparative example 3 | 61.72±0.16bcd | 63.99±0.14ab | 67.16±0.13abc | 5.24±0.27bc |
| Comparative example 4 | 60.89±0.18ef | 63.46±0.22bc | 66.6±0.36cd | 5.00±0.10cd |
| Comparative example 5 | 60.64±0.15fg | 63.12±0.19cd | 66.45±0.30cd | 5.12±0.10bc |
| Comparative example 6 | 61.04±0.29ef | 63.47±0.27bc | 66.55±0.32cd | 5.47±0.39ab |
| Comparative example 7 | 61.98±0.32abc | 64.39±0.37a | 67.44±0.35ab | 5.40±0.07abc |
| Comparative example 8 | 60.19±0.29g | 62.49±0.27d | 65.52±0.37e | 5.25±0.05abc |
| Comparative example 9 | 61.16±0.17def | 63.37±0.15bc | 66.51±0.07cd | 5.31±0.12abc |
| Comparative example 10 | 62.18±0.02ab | 64.37±0.03a | 67.28±0.16abc | 5.14±0.11bc |
| Comparative example 11 | 62.39±0.41a | 64.52±0.40a | 67.64±0.48a | 5.36±0.09abc |
| Comparative example 12 | 61.37±0.05cde | 63.61±0.01bc | 66.70±0.10bcd | 5.30±0.01abc |

FIG. 3

| Samples | Physical photo | L* | a* | b* |
|---|---|---|---|---|
| Example 1 |  | 75.13±0.82 | -1.15±0.34 | 22.1±1.09 |
| Example 2 |  | 74.49±0.40 | -1.09±0.21 | 21.87±0.61 |
| Comparative example 1 |  | 66.21±1.89 | -1.26±0.50 | 20.065±1.38 |
| Comparative example 2 |  | 68.22±0.95 | -2.12±0.14 | 19.56±0.65 |
| Comparative example 3 |  | 67.9625±0.68 | -2.18±0.27 | 17.17±1.18 |
| Comparative example 4 |  | 68.86±1.32 | -1.89±0.15 | 19.90±0.95 |
| Comparative example 5 |  | 68.32±0.84 | -1.325±0.30 | 19.85±0.70 |
| Comparative example 6 |  | 59.98±0.96 | 12.48±0.68 | 38.32±2.26 |
| Comparative example 7 |  | 62.58±0.88 | 14.69±0.59 | 39.07±1.13 |
| Comparative example 8 |  | 68.59±0.25 | 5.78±0.96 | 26.14±1.85 |
| Comparative example 9 |  | 70.35±2.85 | 9.29±1.37 | 32.58±1.90 |
| Comparative example 10 |  | 63.38±2.36 | 12.76±0.79 | 33.78±2.21 |
| Comparative example 11 |  | 62.41±2.44 | 12.58±0.58 | 35.29±3.25 |
| Comparative example 12 |  | 67.84±1.51 | 10.32±0.63 | 33.09±1.04 |
| Comparative example 13 | - | - | - | - |
| Comparative example 14 | - | - | - | - |
| Comparative example 15 | - | - | - | - |
| Comparative example 16 | - | - | - | - |
| Comparative example 17 |  | 63.37±2.90 | 18.71±3.47 | 52.33±3.93 |
| Comparative example 18 |  | 70.52±3.18 | 9.82±1.70 | 39.24±2.32 |
| Comparative example 19 |  | 67.00±0.97 | 12.15±1.64 | 42.34±4.37 |
| Comparative example 20 |  | 57.65±1.17 | 13.04±6.27 | 47.88±1.84 |

PREPARATION METHOD OF FLOUR WITH LOW OIL ABSORPTION DURING FRYING

TECHNICAL FIELD

The present disclosure relates to a preparation method of flour with low oil absorption during frying, belonging to the field of flour modification.

BACKGROUND

Fried foods are loved by people because of their crisp taste and unique flavor, and thus have always occupied an irreplaceable position in many food categories. However, the high fat and high heat and other characteristics of the fried foods can easily induce obesity, cardiovascular and cerebrovascular diseases and other chronic diseases, posing a threat to human health. In addition, the oil adsorbed by fried food can also affect the sensory quality and shelf life of the fried food itself after oxidation. Therefore, effectively reducing the oil absorption of fried foods has dual significance of reducing the incidence of chronic diseases and delaying the deterioration of the fried foods.

Flour, as one of the common raw materials for making fried foods, is often used in fried dough, fried dough cakes, coating flour for fried foods, etc. Modification of flour to reduce its oil absorption after frying has important guiding significance for reducing the oil absorption of fried foods. At present, common modification methods include physical modification, chemical modification, and biological modification. Through these modification methods, the structures of starch, protein and other components in flour can be changed or modified, so that the performance and application value of flour are improved, and the purposes of expanding the scope of application of flour and improving the food quality are finally achieved.

At present, the oil absorption of fried foods is reduced mostly by adding hydrophilic colloids, focusing on the optimization of the formula of coating flour for fried foods. There is a lack of modification of raw materials from the structural level to reduce the oil absorption after frying, especially research on the modification of complex multi-component systems. In view of the oil absorption mechanism in a frying process, the present disclosure takes a multi-component system, i.e., flour as an object, and modifies the structure and function of the flour by means of chemical modification, enzymatic modification, or a combination thereof, so as to achieve the purpose of reducing the oil absorption of the flour after frying, which is a very valuable and innovative research idea. The present disclosure is of great significance for improving the application performance of flour and the quality of fried foods, and solving the safety and quality problems of fried foods.

SUMMARY

In order to solve the above problems, the present disclosure adopts a combination of chemical modification and enzymatic modification to modify the structure and function of flour, that is, a way of adding glutamine transaminase first and then phytic acid or adding phytic acid first and then glutamine transaminase to modify the starch and protein in the flour, so as to improve the tightness between the components in the flour and achieve the purpose of reducing oil absorption after frying. The method is simple, green, and highly practicable. The oil absorption of the modified flour after frying can be reduced by 25-32% compared with the original flour, and can be reduced by about 16% compared with the related art (addition of hydrophilic colloids). Moreover, the color of the modified flour after frying is better.

It is the first object of the present disclosure to provide a preparation method of flour with low oil absorption during frying, which includes the following steps:

(1) pulp blending: evenly dispersing flour in deionized water, stirring evenly, heating and keeping warm to obtain flour dispersion; and (2) flour modification: adding phytic acid and glutamine transaminase into the flour dispersion obtained in step (1), and adjusting pH for reaction.

In one embodiment of the present disclosure, in step (2), the glutamine transaminase is added first and then the phytic acid is added, or the phytic acid is added first and then the glutamine transaminase is added.

In one embodiment of the present disclosure, the flour in step (1) is one or more of low gluten flour, plain flour, or high gluten flour.

In one embodiment of the present disclosure, the flour described in step (1) is a powdery substance ground from wheat.

In one embodiment of the present disclosure, the concentration of the flour dispersion in step (1) is 5-40%.

In one embodiment of the present disclosure, the heating and keeping warm in step (1) refers to heating the flour dispersion to 40-65° C. and keeping same warm for 10-30 min.

In one embodiment of the present disclosure, in step (2), the addition amount of the glutamine transaminase is 2-40 U/g based on the amount of dry basis flour, and the addition amount of the phytic acid is 0.2-4% based on the amount of dry basis flour.

In one embodiment of the present disclosure, in step (2), adjusting the pH refers to adjusting the pH to 5-8, the reaction temperature is 40-65° C., and the reaction time is 1-12 h.

In one embodiment of the present disclosure, the method further includes step (3): washing; and optionally, the step specifically includes: centrifuging and washing the flour dispersion obtained after the reaction in step (2).

In one embodiment of the present disclosure, the centrifuging in step (3) refers to centrifuging for 5-20 min at a rotating speed of 2000-4000 rpm.

In one embodiment of the present disclosure, the washing described in step (3) includes repeated washing with deionized water or anhydrous ethanol by means of centrifugation, suction filtration, or the like.

In one embodiment of the present disclosure, the method further includes step (4): drying; and optionally, the step specifically includes: drying, grinding and sieving the flour obtained in step (3) to obtain modified flour with low oil absorption during frying.

In one embodiment of the present disclosure, the drying in step (4) includes one or more of vacuum drying, freeze drying, blast drying, and drum drying.

In one embodiment of the present disclosure, the grinding in step (4) includes grinding with a mortar and grinding with a flour mill, and the sieving refers to sieving the ground modified flour with an 80-mesh sieve.

It is the second object of the present disclosure to provide chemical-enzymatic double-modified flour prepared by the above-mentioned method.

It is the third object of the present disclosure to provide application of the chemical-enzymatic double-modified flour mentioned above in fried foods.

In one embodiment of the present disclosure, the fried food is fried dough, and a preparation method thereof is as follows:

mixing the original flour with the modified flour with low oil absorption during frying at a mass ratio of 1:1, adding 1% of yeast, pouring warm water at about 38° C. into the obtained mixture, stirring, and kneading dough;

placing the kneaded dough in a fermenting box with a temperature of 38° C. and a humidity of 85% for leavening for 45 min;

dividing the leavened dough into small pieces of dough, each of which is weighed 2 g, and leavening same for another 20 min;

then, putting into a fryer which has been preheated to 180° C., and frying for 4 min; and after frying, draining the oil and cooling to room temperature to obtain the fried dough.

Beneficial effects of the present disclosure:

(1) The present disclosure employs a biological enzyme method and a chemical method to prepare the modified flour with high cross-linking degree to achieve the purpose of reducing oil absorption after frying, so that the raw materials are readily available, the process is simple, the operation is convenient, and the preparation method is green and safe.

(2) After being applied to the fried dough, the flour with low oil absorption during frying prepared by the biological enzyme method and the chemical method according to the present disclosure has the oil absorption reduced by 25-32% compared with the original flour, and has the oil absorption reduced by about 16% compared with the related art (addition of hydrophilic colloids). Moreover, the cost of the method is lower than that of the related art in which hydrophilic colloids are added, and the resulting flour has a better color after frying.

(3) The present disclosure utilizes the addition of glutamine transaminase followed by phytic acid or addition of phytic acid followed by glutamine transaminase to modify flour, which promotes the cross-linking of starch, protein, and starch-protein to form a stable multi-dimensional network structure, and improves the structural tightness of flour and dough, thereby reducing the oil absorption of the flour in a frying process. Therefore, a new idea and method are provided for the preparation of flour with low oil absorption during frying as well as the development of low-fat and low-calorie fried foods.

DETAILED DESCRIPTION

The present disclosure will be further described below in conjunction with examples, but the embodiments of the present disclosure are not limited thereto.

1. Preparation of fried dough: The original flour was mixed with modified flour at a mass ratio of 1:1, 1% of yeast was added, warm water with a temperature of about 38° C. was poured into the obtained mixture, the mixture was stirred and kneaded into dough; the kneaded dough was placed in a fermenting box with a temperature of 38° C. and a humidity of 85% for leavening for 45 min; the leavened dough was divided into small pieces of dough, each of which was weighed 2 g, and the small pieces of dough were leavened for another 20 min; then, the small pieces of dough were put into a fryer which had been preheated to 180° C., and fried for 4 min; and after frying, the oil was drained, and the fried dough was obtained after being cooled to room temperature.

2. Simulated frying: 5 g of modified flour was weighed and then mixed evenly with 50 ml of soybean oil, the obtained mixture was placed in a constant temperature oil bath pan and fried at 180° C. for 10 min; then, vacuum filtration was performed on the fried sample immediately while it was hot; and the sample was placed in a sealed bag for later use after being cooled.

3. Determination of oil absorption: The $T_2$ relaxation time spectrum of the above simulated fried flour was measured by a low-field nuclear magnetic resonance (LF-NMR) instrument. The fried flour obtained after the above-mentioned simulated frying was accurately weighed and then placed in a 5 mL glass sample bottle, the glass sample bottle was sealed with a degreased raw material tape and then put into a 25 mm nuclear magnetic resonance tube; the spin-spin relaxation characteristics of the sample were measured at 32° C. with a CPMG sequence by using the LF-NMR instrument; and a free induction decay signal (FID) mode was taken as the calibration mode, and the test mode used a CPMG pulse sequence. The experimental testing programs were: number of repeated sampling (NS): 32; time for waiting repeated sampling (TW): 2000; number of echoes (NECH): 4000; and time of echo (TE): 0.3 ms. By measuring the peak area of the sample to be tested at 20-1000 ms and the peak area of the soybean oil standard sample under the same conditions, a standard curve was drawn, and the peak area of each sample at 20-1000 ms was substituted into the standard curve. After normalization, the total oil content of the simulated fried flour was calculated.

4. Thermodynamic property analysis: A differential scanning calorimeter (DSC) was used to determine the thermodynamic properties of the modified flour. 2.0-3.0 mg of modified flour was weighed and then put into an aluminum crucible, and deionized water was then added in a ratio of 1:2 (w/w); and the crucible was immediately sealed, then placed in a sealed bag, and equilibrated at room temperature for 12 h. A closed empty crucible was used as a control, and heated up to 100° C. from 30° C. at a heating rate of 10° C./min. The starting temperature ($T_0$), peak temperature ($T_p$), final temperature ($T_c$), and enthalpy value ($\Delta H$) were calculated using software that came with the instrument.

5. Determination of chromaticity: A hand-held colorimeter was used to analyze the chromaticity of fried dough obtained from a real frying system.

Example 1: Impact of Addition of Glutamine Transaminase Followed by Phytic Acid for Preparation of Modified Flour on the Frying Effect of the Modified Flour (1) Pulp blending: 40 g of plain flour was evenly dispersed in 200 ml of deionized water, stirred evenly, heated up to 45° C. and kept warm for 10-30 min to obtain flour dispersion with a flour concentration of 20%.
(2) Flour modification: 10 U/g of glutamine transaminase was added into the flour dispersion obtained in step (1), the pH was adjusted to 7.0, and a reaction was performed at 45° C. for 2 h; and then, 1% of phytic acid was added, the pH was adjusted to 7.0 too, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Example 2: Impact of Addition of Phytic Acid Followed by Glutamine Transaminase for Preparation of Modified Flour on the Frying Effect of the Modified Flour (1) Pulp blending: 40 g of plain flour was evenly dispersed in 200 mL of deionized water, stirred evenly, heated up to 45° C. and kept warm for 10-30 min to obtain flour dispersion with a flour concentration of 20%.
(2) Flour modification: 1% of phytic acid was added into the flour dispersion obtained in step (1), the pH was adjusted to 7.0, and a reaction was performed at 45° C. for 2 h; and then, 10 U/g of glutamine transaminase was added, the pH was adjusted to 7.0 too, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 1: Effect of Original Flour on its Frying Effect (1) Pulp blending: 40 g of plain flour was evenly dispersed in 200 ml of deionized water, stirred evenly, heated up to 45° C. and kept warm for 10-30 min to obtain flour dispersion with a flour concentration of 20%; and the pH was adjusted to 7.0, and the obtained mixture was kept warm at 45° C. for 2 h.
(2) Washing: The flour dispersion obtained after the reaction in step (1) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(3) Drying: The flour obtained in step (2) was dried at 50° C. in an air blast drying oven for 6 h, and then ground with a flour mill; and the ground modified flour was sieved with an 80-mesh sieve to obtain modified flour with low oil absorption during frying.

Comparative Example 2: Effect of Glutamine Transaminase Modified Flour on its Frying Effect (1) Pulp blending: 40 g of plain flour was evenly dispersed in 200 ml of deionized water, stirred evenly, heated up to 45° C. and kept warm for 10-30 min to obtain flour dispersion with a flour concentration of 20%.
(2) Flour modification: 10 U/g of glutamine transaminase was added into the flour dispersion obtained in step (1), the pH was adjusted to 7.0, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 3: Effect of Phytic Acid Modified Flour on its Frying Effect (1) Pulp blending: 40 g of plain flour was evenly dispersed in 200 mL of deionized water, stirred evenly, heated up to 45° C. and kept warm for 10-30 min to obtain flour dispersion with a flour concentration of 20%.
(2) Flour modification: 1% of phytic acid was added into the flour dispersion obtained in step (1), the pH was adjusted to 7.0, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 4: Impact of Simultaneous Addition of Glutamine Transaminase and Phytic Acid on Frying Effect (1) Pulp blending: 40 g of plain flour was evenly dispersed in 200 mL of deionized water, stirred evenly, heated up to 45° C. and kept warm for 10-30 min to obtain flour dispersion with a flour concentration of 20%.
(2) Flour modification: 10 U/g of glutamine transaminase and 1% of phytic acid were added into the flour dispersion obtained in step (1), the pH was adjusted to 7.0, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 5: Impact of Adding Hydrophilic Colloid (Pectin) on the Frying Effect of Flour (1) Pulp blending: 40 g of plain flour was evenly dispersed in 200 ml of deionized water, stirred evenly, heated up to 45° C. and kept warm for 10-30 min to obtain flour dispersion with a flour concentration of 20%; and the pH was adjusted to 7.0;
(2) Addition of hydrophilic colloid: 1% (based on the amount of dry basis flour) of pectin was added into the flour dispersion obtained in step (1) and stirred evenly, and the obtained mixture was maintained at a constant temperature of 45° C. for 2 h.
(3) Washing: The flour dispersion obtained in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 6: Impact of Adding 2 Times the Amount of Phytic Acid for Preparation of Modified Flour on the Frying Effect of the Modified Flour (1) Pulp blending: 40 g of plain flour was evenly dispersed in 200 mL of deionized water, stirred evenly, heated up to 45° C. and kept warm for 10-30 min to obtain flour dispersion with a flour concentration of 20%.
(2) Flour modification: 2% of phytic acid was added into the flour dispersion obtained in step (1), the pH was adjusted to 7.0, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 7: Impact of Adding 3 Times the Amount of Phytic Acid for Preparation of Modified Flour on the Frying Effect of the Modified Flour (1) Pulp blending: 40 g of plain flour was evenly dispersed in 200 ml of deionized water, stirred evenly, heated up to 45° C. and kept warm for 10-30 min to obtain flour dispersion with a flour concentration of 20%.
(2) Flour modification: 3% of phytic acid was added into the flour dispersion obtained in step (1), the pH was adjusted to 7.0, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 8: Impact of Adding 2 Times the Amount of Glutamine Transaminase for Preparation of Modified Flour on the Frying Effect of the Modified Flour (1) Pulp blending: 40 g of plain flour was evenly dispersed in 200 mL of deionized water, stirred evenly, heated up to 45° C. and kept warm for 10-30 min to obtain flour dispersion with a flour concentration of 20%.
(2) Flour modification: 20 U/g of glutamine transaminase was added into the flour dispersion obtained in step (1), the pH was adjusted to 7.0, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 9: Impact of Adding 3 Times the Amount of Glutamine Transaminase for Preparation of Modified Flour on the Frying Effect of the Modified Flour (1) Pulp blending: 40 g of plain flour was evenly dispersed in 200 ml of deionized water, stirred evenly, heated up to 45° C. and kept warm for 10-30 min to obtain flour dispersion with a flour concentration of 20%.
(2) Flour modification: 30 U/g of glutamine transaminase was added into the flour dispersion obtained in step (1), the pH was adjusted to 7.0, and a reaction was performed at 45° C. for 2 h.
(3) Washing: The flour dispersion obtained after the reaction in step (2) was centrifuged for 15 min at a speed of 4000 rpm, the supernatant was poured off, an equal volume of anhydrous ethanol was added, the obtained mixture was shaken for evenly mixing, and the product was subjected to suction filtration by a vacuum filter.
(4) Drying: The flour obtained in step (3) was dried at 50° C. in an air blast drying oven for 6 h, and then ground with a flour mill; and the ground modified flour was sieved with an 80-mesh sieve to obtain modified flour with low oil absorption during frying.

Comparative Example 10: Replacing Phytic Acid with Citric Acid and Glutamine Transaminase with Laccase The phytic acid in Example 1 was replaced with citric acid, the glutamine transaminase was replaced with laccase, and the others were the same as those in Example 1, so that modified flour with low oil absorption during frying was obtained.

Comparative Example 11: Replacing Glutamine Transaminase with Laccase

The glutamine transaminase in Example 1 was replaced with laccase, and the others were the same as those in Example 1, so that modified flour with low oil absorption during frying was obtained.

Comparative Example 12: Replacing Phytic Acid with Citric Acid

The phytic acid in Example 1 was replaced with citric acid, and the others were the same as those in Example 1, so that modified flour with low oil absorption during frying was obtained.

Comparative Example 13: Adding Phytic Acid First and then Glutamine Transaminase During Simulated Frying 5 g of unmodified flour and 50 ml of soybean oil were mixed together evenly, and 1% of phytic acid (relative to the unmodified flour) was added in the mixing process; and then, the obtained mixture was placed in an oil bath pan at 180° C., and 10 U/g of glutamine transaminase (relative to the unmodified flour) was added into the oil bath pan at the same time and maintained for 10 min.

Comparative Example 14: Adding Glutamine Transaminase First and then Phytic Acid During Simulated Frying 5 g of unmodified flour and 50 ml of soybean oil were mixed together evenly, and 10 U/g of glutamine transaminase (relative to the unmodified flour) was added in the mixing process; and then, the obtained mixture was placed in an oil bath pan at 180° C., and 1% of phytic acid (relative to the unmodified flour) was added into the oil bath pan at the same time and maintained for 10 min.

Comparative Example 15: Simultaneous Addition of Phytic Acid and Glutamine Transaminase Prior to Frying During Simulated Frying 5 g of unmodified flour and 50 mL of soybean oil were mixed together evenly, and 1% of phytic acid (relative to the unmodified flour) and 10 U/g of glutamine transaminase (relative to the unmodified flour) were added at the same time in the mixing process; and then, the obtained mixture was placed in an oil bath pan at 180° C. to be subjected to oil bath for 10 min.

Comparative Example 16: Simultaneous Addition of Phytic Acid and Glutamine Transaminase During Frying in the Simulated Frying Process 5 g of unmodified flour and 50 mL of soybean oil were mixed together evenly, the obtained mixture was then placed in an oil bath pan at 180° C., and 1% of phytic acid (relative to the unmodified flour) and 10 U/g of glutamine transaminase (relative to the unmodified flour) were added at the same time in the oil bath process; and the oil bath process lasted for 10 min.

Comparative Example 17: Adding Phytic Acid First and then Glutamine Transaminase During Preparation of Fried Dough 1% of yeast was added into 20 g of unmodified flour, warm water with a temperature of about 38° C. was poured into the obtained mixture, 1% of phytic acid (relative to the flour) was added, and the mixture was stirred and kneaded into dough; the kneaded dough was placed in a fermenting box with a temperature of 38° C. and a humidity of 85% for leavening for 45 min; the leavened dough was added with 10 U/g of glutamine transaminase (relative to the flour) and then divided into small pieces of dough, each of which was weighed 2 g, and the small pieces of dough were leavened for another 20 min; then, the small pieces of dough were put into a fryer which had been preheated to 180° C., and fried for 4 min; and after frying, the oil was drained, and the fried dough was obtained after being cooled to room temperature.

Comparative Example 18: Adding Glutamine Transaminase First and then Phytic Acid During Preparation of Fried Dough 1% of yeast was added into 20 g of unmodified flour, warm water with a temperature of about 38° C. was poured into the obtained mixture, 10 U/g of glutamine transaminase (relative to the flour) was added, and the mixture was stirred and kneaded into dough; the kneaded dough was placed in a fermenting box with a temperature of 38° C. and a humidity of 85% for leavening for 45 min; the leavened dough was added with 1% of phytic acid (relative to the flour) and then divided into small pieces of dough, each of which was weighed 2 g, and the small pieces of dough were leavened for another 20 min; then, the small pieces of dough were put into a fryer which had been preheated to 180° C., and fried for 4 min; and after frying, the oil was drained, and the fried dough was obtained after being cooled to room temperature.

Comparative Example 19: Simultaneous Addition of Phytic Acid and Glutamine Transaminase at the Time of 45 Min of Leavening Stage in the Preparation Process of Fried Dough 1% of yeast was added into 20 g of unmodified flour, warm water with a temperature of about 38° C. was poured into the obtained mixture, 10 U/g of glutamine transaminase (relative to the flour) and 1% of phytic acid (relative to the flour) were added, and the mixture was stirred and kneaded into dough; the kneaded dough was placed in a fermenting box with a temperature of 38° C. and a humidity of 85% for leavening for 45 min; the leavened dough was divided into small pieces of dough, each of which was weighed 2 g, and the small pieces of dough were leavened for another 20 min; then, the small pieces of dough were put into a fryer which had been preheated to 180° C., and fried for 4 min; and after frying, the oil was drained, and the fried dough was obtained after being cooled to room temperature.

Comparative Example 20: Simultaneous Addition of Phytic Acid and Glutamine Transaminase at the Time of 20 Min of Leavening Stage in the Preparation Process of Fried Dough 1% of yeast was added into 20 g of unmodified flour, warm water with a temperature of about 38° C. was poured into the obtained mixture, and the mixture was stirred and kneaded into dough; the kneaded dough was placed in a fermenting box with a temperature of 38° C. and a humidity of 85% for leavening for 45 min; the leavened dough was added with 10 U/g of glutamine transaminase (relative to the flour) and 1% of phytic acid (relative to the flour) and then divided into small pieces of dough, each of which was weighed 2 g, and the small pieces of dough were leavened for another 20 min; then, the small pieces of dough were put into a fryer which had been preheated to 180° C., and fried for 4 min; and after frying, the oil was drained, and the fried dough was obtained after being cooled to room temperature.

Result Determination:

1. Determination of Oil Absorption of Modified Flour in a Simulated System

Figure 1:
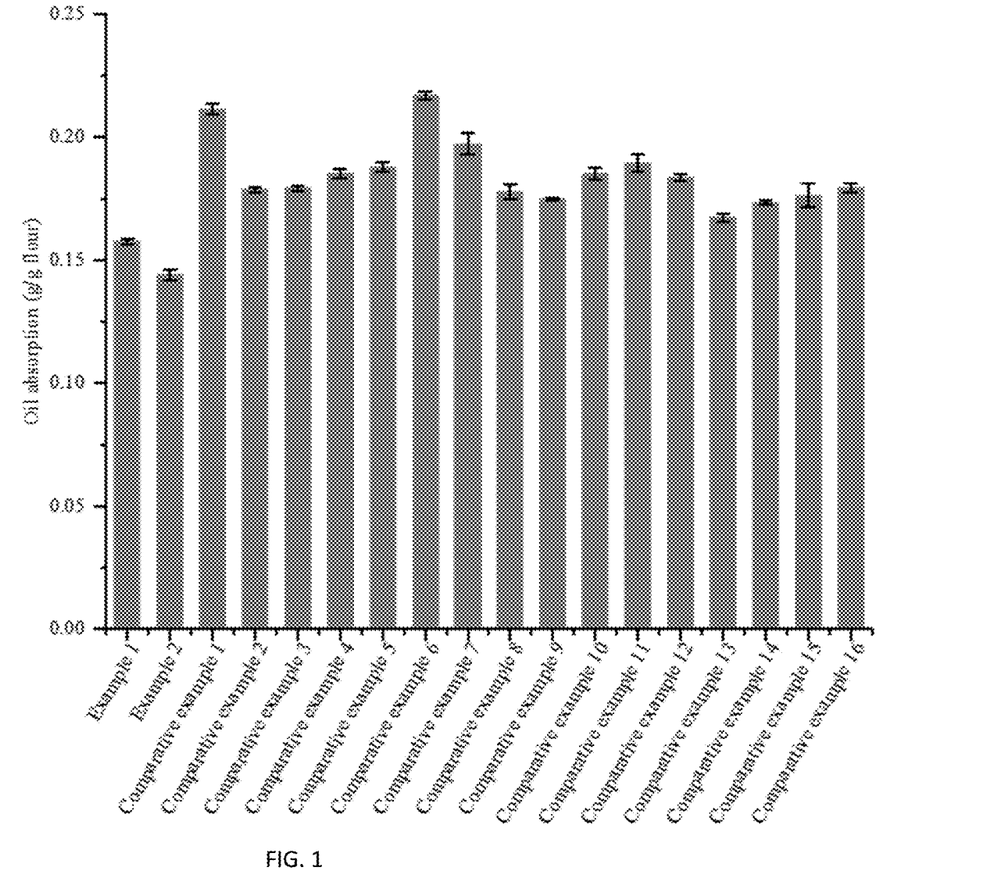
FIG. 1 shows the oil absorption of modified flour prepared in Examples 1-2 and Comparative Examples 1-16 according to the present disclosure in the simulated system.

Table 1 and FIG. 1 show the oil absorption data of the modified flour after simulated frying. It can be seen from Table 1 and FIG. 1 that the oil absorption of the modified flour prepared in Examples 1-2 in a simulated frying system is lower than that of the modified flour prepared in all the Comparative Examples, which indicates that the modified flour prepared in Examples 1-2 has reliable low oil absorption performance during frying.

TABLE 1

Oil absorption during simulated frying in Examples 1-2 and Comparative Examples 1-16

| Example | Oil absorption (g/g flour) |
| --- | --- |
| Example 1 | 0.15773 ± 0.00106 |
| Example 2 | 0.14423 ± 0.00222 |
| Comparative Example 1 | 0.21151 ± 0.00235 |
| Comparative Example 2 | 0.17863 ± 0.00102 |
| Comparative Example 3 | 0.17925 ± 0.00102 |
| Comparative Example 4 | 0.18526 ± 0.00177 |
| Comparative Example 5 | 0.18788 ± 0.00179 |
| Comparative Example 6 | 0.21699 ± 0.00165 |
| Comparative Example 7 | 0.19744 ± 0.00422 |
| Comparative Example 8 | 0.17790 ± 0.00309 |
| Comparative Example 9 | 0.17485 ± 0.00051 |
| Comparative Example 10 | 0.18514 ± 0.00247 |
| Comparative Example 11 | 0.18966 ± 0.00335 |
| Comparative Example 12 | 0.18377 ± 0.00147 |
| Comparative Example 13 | 0.16731 ± 0.00176 |
| Comparative Example 14 | 0.17350 ± 0.00071 |

TABLE 1-continued

Oil absorption during simulated frying in Examples 1-2 and Comparative Examples 1-16

| Example | Oil absorption (g/g flour) |
| --- | --- |
| Comparative Example 15 | 0.17635 ± 0.00502 |
| Comparative Example 16 | 0.17951 ± 0.00190 |

2. Determination of Thermal Properties of Modified Flour

Figure 2:
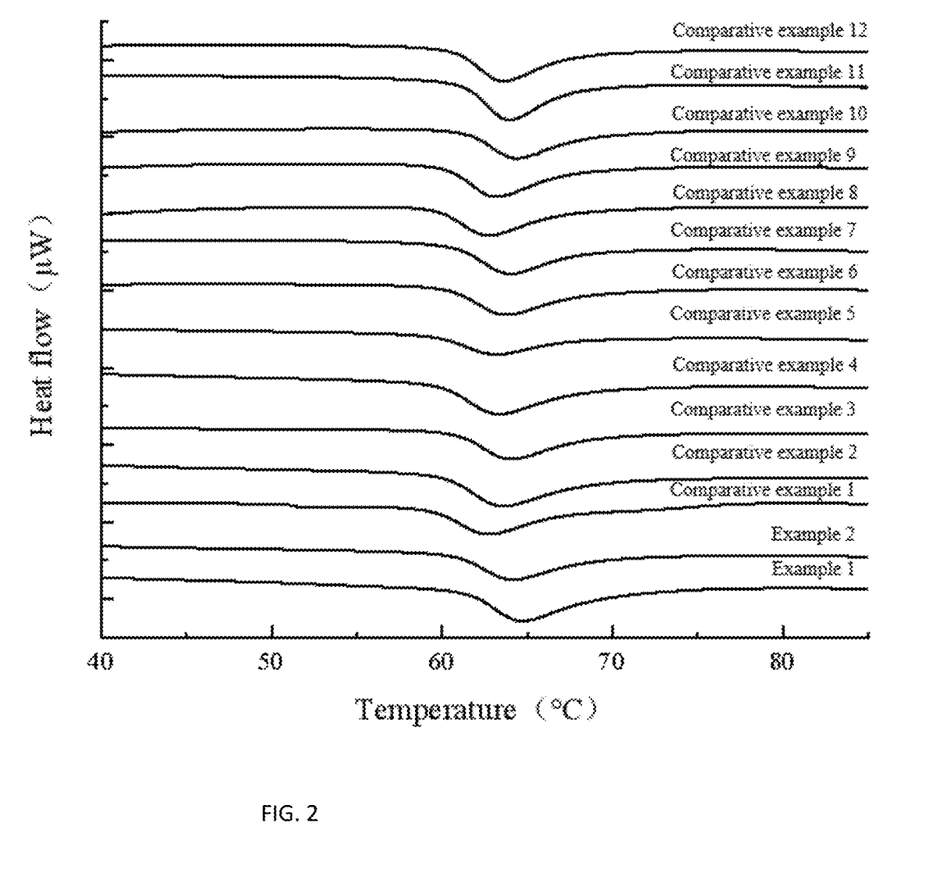
FIG. 2 shows DSC spectra of modified flour prepared in Examples 1-2 and Comparative Examples 1-12 according to the present disclosure.
Figure 3:
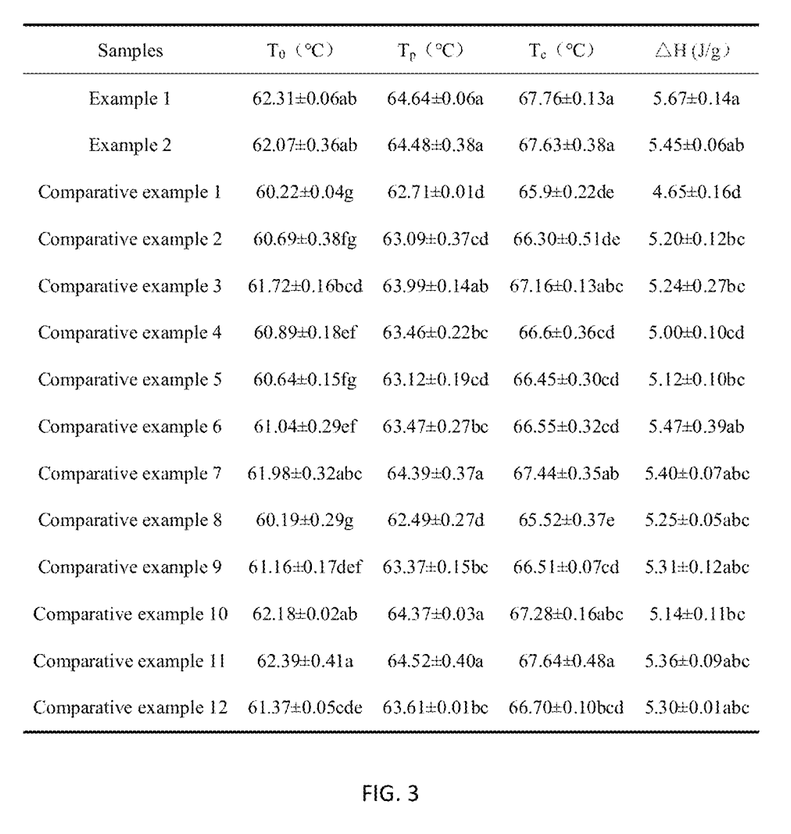
FIG. 3 shows the DSC thermodynamic parameters of modified flour prepared in Examples 1-2 and Comparative Examples 1-12 according to the present disclosure.

The thermal properties of the modified flour prepared in Examples 1-2 and Comparative Examples 1-12 were determined, and their DSC spectra and thermodynamic parameters are as shown in FIG. 2 and FIG. 3. It can be seen from FIG. 2 and FIG. 3 that, compared with Comparative Examples 1-12, the endothermic peaks of Examples 1-2 are significantly shifted backward, indicating that their thermal properties are improved; the ΔH of Comparative Example 6 is not significantly different from that of Example 2, but its gelatinization temperature is lower than those of Examples 1-2; and although the gelatinization temperature of Comparative Example 11 is not significantly different from those of the examples, its ΔH is lower than those of Examples 1-2. The improved thermal properties of Examples 1-2 demonstrate that the cross-linking degree is increased after modification.

Figure 4:
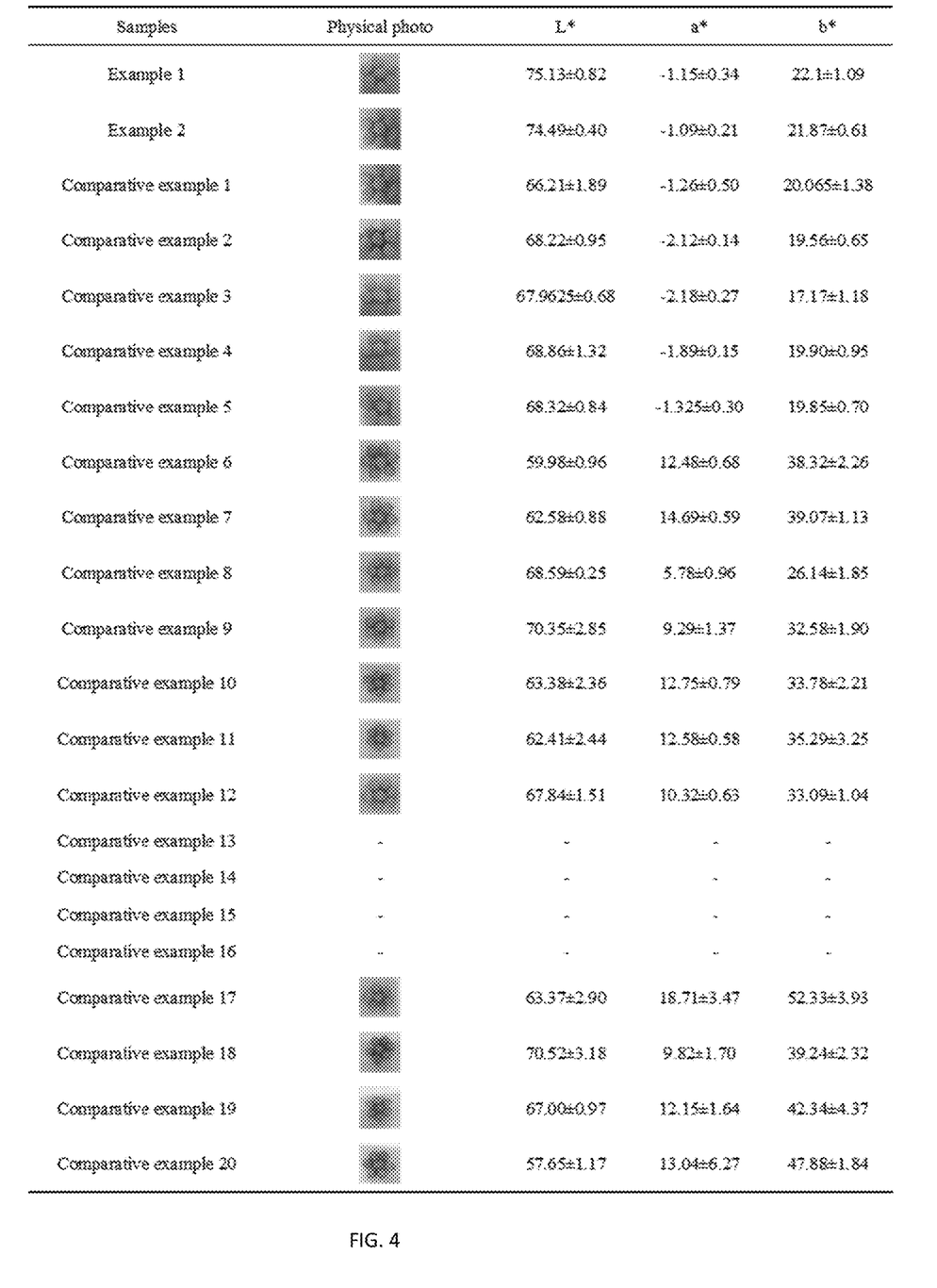
FIG. 4 shows the color and profile display of modified flour prepared in Examples 1-2 and Comparative Examples 1-20 according to the present disclosure after being applied in a real frying system.

3. The Effect of Modified Flour on Color and Profile Display after being Applied to Real Frying System The profile display and color analysis of the fried dough obtained by applying the modified flour in a real frying system are shown in FIG. 4. High brightness (L*) and high yellowness (b*) fried foods are preferred by consumers. It can be seen from FIG. 4 that after the modified flour prepared in Examples 1-2 is used in fried dough, the L* value (high brightness) of the fried dough is higher than those of all Comparative Examples. Although the b* of Examples 1-2 is lower than that of Comparative Examples 6-12 and Comparative Examples 17-20, it can be seen from the physical photos that the colors of Comparative Examples 6-12 and Comparative Examples 17-20 are brownish, and the colors of Examples 1-2 are golden rather than brown, which proves that the application of the modified flour prepared in Examples 1-2 in fried dough is more conducive to obtaining better color in fried dough.

Figure 5:
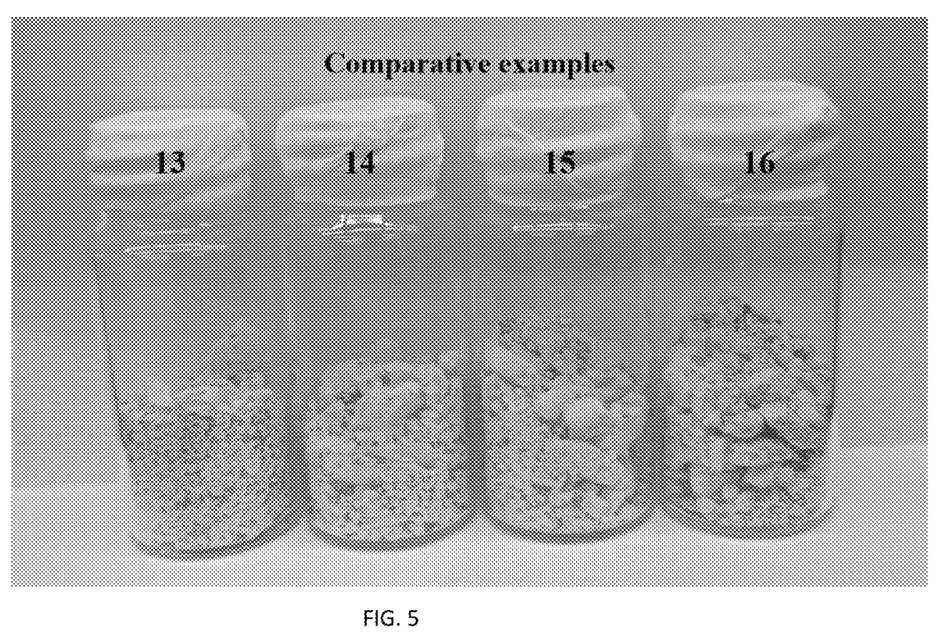
FIG. 5 shows physical photos of flour prepared in Comparative Examples 13-16 after being subjected to simulated frying.

The physical photos of the flour subjected to simulated frying in Comparative Examples 13-16 are as shown in FIG. 5. It can be seen from FIG. 5 that black substances appear in the flour prepared in Comparative Examples 13-16, which indicates that adding phytic acid and glutamine transaminase in a simulated frying process will have some adverse effects on the flour.

Although the present disclosure has been disclosed as above in exemplary embodiments, it is not intended to limit the present disclosure. Anyone familiar with this technology can make various changes and modifications without departing from the spirit and scope of the present disclosure. Therefore, the protection scope of the present disclosure shall be as defined in the Claims.

What is claimed is:

1. A preparation method of a modified flour product, comprising the following steps:
    (1) dispersing flour in water, heating to 40 to 65° C., and keeping warm for 10-30 minutes to obtain flour dispersion; and (2) first adding phytic acid into the flour dispersion obtained in step (1) and performing flour modification reaction at a PH of 5-8, temperature ranges of 40-65° C. for 1-12 hours, and then adding glutamine transaminase and performing flour modification reaction at a PH of 5-8, temperature ranges of 40-65° C. for 1-12 hours; or first adding glutamine transaminase into the flour dispersion obtained in step (1) and performing flour modification reaction at a PH of 5-8, temperature ranges of 40-65° C. for 1-12 hours, and then adding phytic acid and performing flour modification reaction at a PH of 5-8, temperature ranges of 40-65° C. for 1-12 hours.

2. The method according to claim 1, wherein in step (2), the addition amount of the glutamine transaminase is 2-40 U/g based on the amount of dry basis flour, and the addition amount of the phytic acid is 0.2-4% based on the amount of dry basis flour.

3. The method according to claim 1, wherein the method further comprises step (3): washing the flour dispersion obtained in step (2).

4. The method according to claim 3, wherein the washing in step (3) comprises centrifugation and suction filtration.

5. The method according to claim 1, wherein the method further comprises step (3): washing the flour dispersion obtained in step (2) to obtain modified flour and step (4): drying the modified flour obtained in step (3) to obtain a modified flour product.

6. The method according to claim 5, wherein the drying method in step (4) comprises one or more of vacuum drying, freeze drying, blast drying, and drum drying.

7. The method according to claim 3, wherein the washing the flour dispersion obtained in step (2) comprises centrifuging the flour dispersion for 15 min at a speed of 4000 rpm, pouring off supernatant, adding an anhydrous ethanol in equal volume to the supernatant, shaking to obtain an even mix, and subjecting the even mix to suction filtration by a vacuum filter.

8. The method according to claim 5, wherein drying the modified flour obtained in step (3) comprises drying the modified flour at 50° C. in an air blast drying oven for 6 hours, grounding the modified flour with a flour mill, and sieving grounded modified flour with an 80-mesh sieve to obtain the modified flour product.

* * * * *